United States Patent
Olsson et al.

(10) Patent No.: US 8,094,579 B2
(45) Date of Patent: Jan. 10, 2012

(54) PERFORMANCE MEASUREMENT

(75) Inventors: Andreas Olsson, Stockholm (SE); David Sandberg, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 181 days.

(21) Appl. No.: 12/558,033

(22) Filed: Sep. 11, 2009

(65) Prior Publication Data

US 2010/0214935 A1    Aug. 26, 2010

Related U.S. Application Data

(60) Provisional application No. 61/155,173, filed on Feb. 25, 2009.

(51) Int. Cl.
*H04L 1/00* (2006.01)

(52) U.S. Cl. ........................... 370/252; 370/329

(58) Field of Classification Search ................ 370/252, 370/328–339; 455/422.1–426.2, 436–444
See application file for complete search history.

(56) References Cited

U.S. PATENT DOCUMENTS

2004/0176040 A1 *  9/2004  Thornton et al. .......... 455/67.11

FOREIGN PATENT DOCUMENTS

WO    WO 2008/040503    *  4/2008

OTHER PUBLICATIONS

Parkvall et al, LTE-Advanced—Evolving LTE towards IMT-Advanced, IEEE, 5 pages, 2008.*
Feng et al, Coordinated multi-point transmission and reception for LTE-Advanced, IEEE, 4 pages, 2009.*

* cited by examiner

*Primary Examiner* — Frank Duong

(57) ABSTRACT

A controlling node for a cell in a cellular system, arranged to measure a performance indicator of the communication between the node and at least one user and to aggregate the measured performance indicator for at least one user over an amount of time. The performance indicator is measured as the amount of data bits successfully transferred as data blocks in uplink and/or downlink between the controlling node and the at least one user during said defined amount of time, divided by the number of smallest physical resources in the system in terms of time and frequency used during said defined amount of time. One or more predefined combinations of one or more data blocks and one or more said smallest physical resources in the system is/are excluded from the aggregated measurement.

22 Claims, 5 Drawing Sheets

PERFORMANCE MEASUREMENT

CROSS-REFERENCE TO RELATED APPLICATIONS

This application claims the benefit of U.S. Provisional Application No. 61/155,173, filed Feb. 25, 2009, the disclosure of which is fully incorporated herein by reference.

TECHNICAL FIELD

The present invention discloses a controlling node for a cell in a cellular communications system which is arranged to measure a performance indicator of the communication between the node and at least one user in the cell.

BACKGROUND

In cellular radio communication systems, it has always been important for e.g. a system operator to monitor the performance of the end-user services, to identify areas of poor quality and to improve the performance by means of capacity upgrade and network tuning.

There exist radio network nodes which measure so called performance indicators in a system on a statistical basis. This enables the network operator to monitor the performance of the service delivered to the mobile subscribers and to detect areas where the service performance is below an acceptable level. It is also possible for the system operator to find the root cause of poor quality, e.g. an under-dimensioned node such as a radio base station, "RBS", i.e. a controlling node of a cell in the system, or, for example, faulty parameter settings for handovers in a cell.

In existing systems, e.g. GSM systems, one known way of obtaining a performance indicator for a cell in the system is to measure the amount of successfully transferred data divided by the time used to transfer the data. In this manner, the so called radio link bit rate is obtained.

For LTE systems, Long Term Evolution, it is desired by system operators to obtain more standardized performance indicators, so that measurements can be compared between different LTE vendors. LTE systems are also referred to as E-UTRAN systems.

SUMMARY

It is an object of the present invention to provide a solution by means of which measurements of a performance indicator in a cell in a cellular system can be improved upon, as compared to previous solutions.

Such a solution is provided by the present invention in that it discloses a controlling node for a cell in a cellular communications system. The node of the invention is arranged to measure a performance indicator of the communication between the node and at least one user in the cell, and is also arranged to aggregate the measured performance indicator for the at least one user over a defined amount of time.

In addition, in the controlling node of the invention the performance indicator is measured as the amount of data bits successfully transferred in blocks in at least one direction, uplink and/or downlink, between the controlling node and the at least one user during said defined amount of time, divided by the number of smallest physical resources in the system in terms of time and frequency, which have been used for the successful transfer of the data bits during said defined amount of time.

The inventive node is also arranged to exclude from the aggregated measurement one or more predefined combinations of one or more data blocks and one or more said smallest physical resources in the system.

By means of excluding the one or more predefined combinations from the aggregated measurement, the controlling node can obtain a more correct performance indicator than has hitherto been possible.

The invention can be applied both in LTE and WiMax, so that in one embodiment, the controlling node of the invention is an eNodeB in an LTE system, whilst, in another embodiment, the controlling node of the invention is a WiMax Base Station, a WiMax BS.

Similarly, the data blocks mentioned can be either LTE Transport Blocks, or WiMax Protocol Data Units, WiMax PDUs, and the smallest physical resource can be either the LTE Resource Element or the WiMax slot.

The performance indicator is suitably the Radio Link Bit Rate in LTE applications, whilst in WiMax applications it is the Physical Layer Data Rate. However, the performance indicator obtained by means of the invention could also be termed "normalized Radio Link Bit Rate".

Suitably, the aggregated measurements which are carried out by means of the invention are reported by the controlling node to network management systems and/or domain management systems.

The invention also discloses an essentially corresponding method.

BRIEF DESCRIPTION OF THE DRAWINGS

The invention will be described in more detail in the following, with reference to the appended drawings, in which.

DETAILED DESCRIPTION

In order to enhance the understanding of the invention, a brief background description will be given below. The description below, as well as the description of the invention, will use terms from an LTE, Long Term Evolution, system, but it should be pointed out that this is by way of example only; the invention is also applicable in other cellular communications systems, such as, for example, WiMax systems. Thus, the terms below should be seen as generic terms rather than system specific terms. For example, the eNodeB of the LTE system can be replaced with a WiMax BS, Base Station, and the Resource Elements of the LTE system can be replaced with WiMax "slots".

Figure 1:
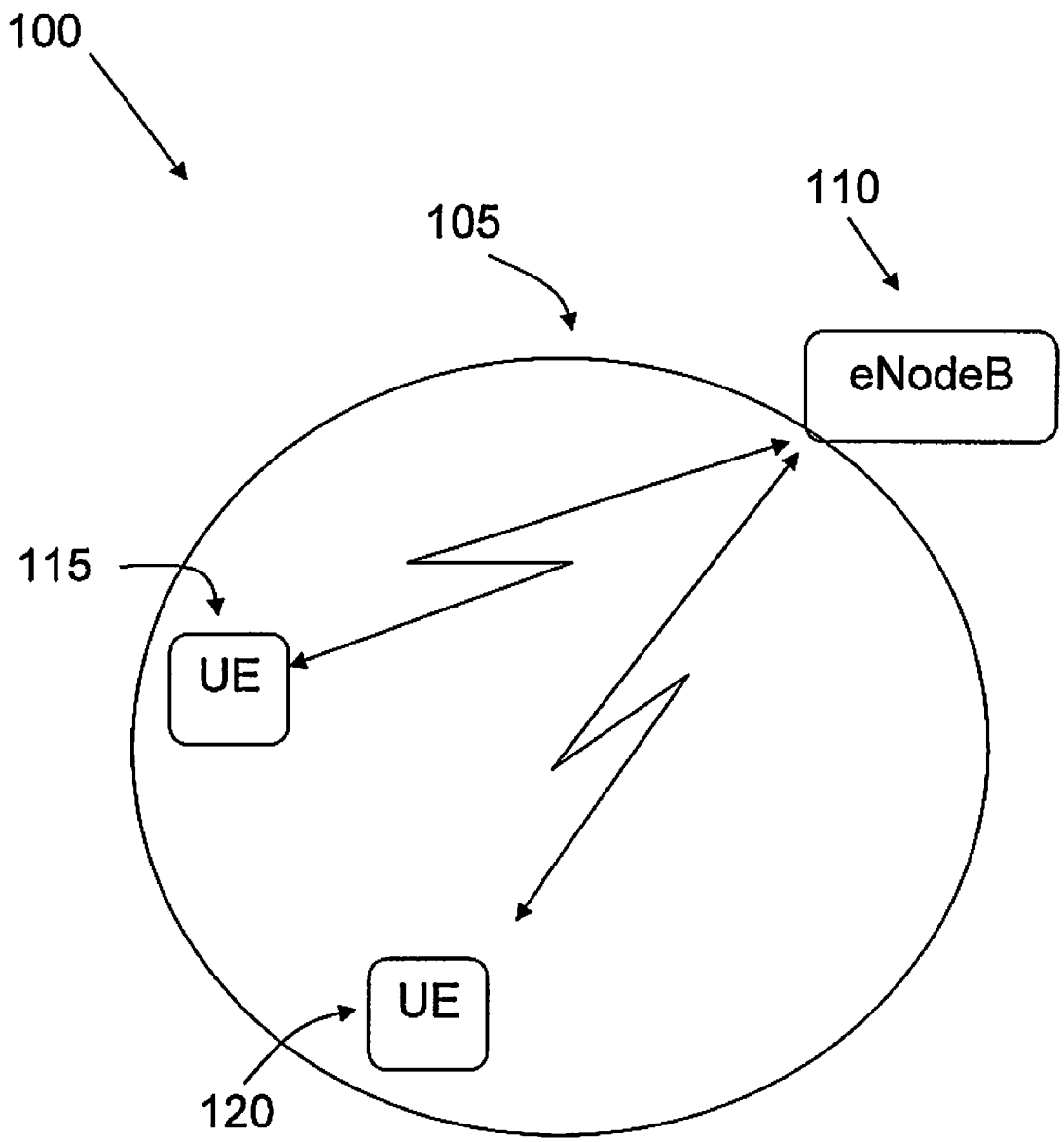
FIG. 1 shows an overview of a system in which the invention can be applied.

Turning now to the system 100 which is schematically illustrated in FIG. 1, the system comprises a number of cells, one of which is shown as 105 in FIG. 1. For each cell there is a controlling node, in LTE systems referred to as the eNodeB, which is shown as 110 in FIG. 1. Each cell can accommodate a number of users, "UEs", two of which are shown as 115, 120 in FIG. 1. One role of the eNodeB 110 is that traffic to and from the UEs in the cell 105 is routed via the eNodeB 110.

The transmissions between the eNodeB 110 and the UEs 115, 120, in the cell can be scheduled by a scheduling unit in the eNodeB, or in alternative embodiments, can be scheduled by another node in the system and simply forwarded to the eNodeB. The scheduling is, in LTE systems, done mainly by means of allocating so called Resource Units, or Resource Elements, REs, to the transmitting party, i.e. either the UE or the eNodeB depending on which direction, uplink or downlink, that the transmission is to be made. The REs are the smallest physical resources in the system in terms of time and frequency, and correspond to the notion of "slots" in WiMax systems. In LTE, data is transferred by means of so called Transport Blocks, corresponding to WiMax PDUs, Protocol Data Units.

In order to measure the performance of the radio interface between the UEs and the eNodeB, a traditional performance indicator to measure has been the so called Radio Link Bit rate, the RLB. However, the inventors of the present invention have noticed a number of factors which might impair the veracity of the RLB as a performance indicator, at least if it is measured simply as the transferred amount of bits per time unit. These impairing factors will be described briefly below.

Transport Block Size/initial transmission uncertainty. In a radio system, before any initial transfer between UE and eNodeB has been carried out, there exists no channel quality feedback to the eNodeB; hence the eNodeB has to guess/estimate the radio quality for the UE in question. Usually, the decision in the eNodeB of which coding and modulation that should be used for these initial transport blocks are a bit defensive, so higher protection than necessary is probably used, and therefore the radio link bit rate does not reflect the channel quality.

Transport Block Size/turbo coding efficiency. For large TBs, the efficiency of turbo encoding is better than for small TBs. Hence a need to compensate low efficiency by means of a turbo encoder with lower code rate for small TBs (rate: info/total number of bits). Hence the radio link bit rate does not reflect the channel quality (i.e. traffic model influence).

Transport Block Size/uplink power limitation in the UE. For large TBs in the uplink, a certain output power is needed from the UE to transmit the data. If the available power of the UE is not enough to transfer large TBs, the UE is considered power limited. If the UE is power limited, smaller TBs have to be used, and hence a lower radio link bit rate is achieved. In such cases, the radio link bit rate measured does not reflect the channel quality, i.e. the UE capability and the UE position distribution influence.

Transport Block Size/limited amount of data in buffer. The last data to be transferred in a session, i.e. the last part of a buffer, will sometimes not match the available TB Size. Hence, the radio link bit rate does not reflect the channel quality.

According to the invention, the eNodeB measures a performance indicator, e.g. referred to as the Radio Link Bit Rate, as the amount of data bits successfully transferred in or as data blocks in the uplink and/or downlink direction during a defined amount of time, divided by the number of smallest physical resources defined in the system in terms of time and frequency, which have been used during the defined amount of time for the transfer of the successfully transferred data bits. The performance indicator is aggregated by the eNodeB over the defined amount of time. However, it is entirely within the scope of the present invention to let the eNodeB "stream" all of the data which is relevant for the measurements to another node in the system, where the measurements and the aggregation is carried out.

In order to enhance the representativeness of the performance indicator, the eNodeB is also arranged to exclude from the aggregated measurement one or more predefined combinations of one or more Transport Blocks, TBs, and one or more Resource Units. Suitably, the Resource Units which are comprised in the excluded combinations are the Resource Units, REs, which were or are scheduled for the excluded Transport Blocks. Although the representativeness of the performance indicator will be enhanced by excluding one or more of the combinations given below, optimal representativeness will be obtained if all of the combinations below are excluded.

Examples of suitable combinations of TBs and REs for exclusion are given below:

TBs scheduled prior to channel quality feedback and the REs for those TBs which were or are scheduled prior to channel quality feedback being received by the eNodeB. This can also be expressed as a combination of one or more data blocks which have been scheduled for transmission by the controlling node prior to the controlling node receiving information on the quality of the channel on which the one or more data blocks are to be transmitted and the smallest physical units which have been scheduled by the controlling node for the transmission of those one or more data blocks.

TBs scheduled with a limited amount of data in the buffer, and the REs which were or are scheduled for those TBs. This can also be expressed as a combination of one or more data blocks which have been scheduled by the controlling node for transmission from a transmit buffer with the transmit buffer being only filled to a defined limit and the smallest physical units which have been scheduled by the controlling node for the transmission of those one or more data blocks.

TBs scheduled where a UE is power limited and the REs which were or are scheduled for those TBs. This can also be expressed as a combination of one or more data blocks which have been scheduled by the controlling node for uplink transmission from a user who cannot utilize more than a certain amount of its output power and the smallest physical units which have been scheduled by the controlling node for the transmission of those one or more data blocks.

TBs scheduled where the efficiency of a coder-decoder such as a turbo codec is limited, and the REs which were or are scheduled for those TBs. The efficiency limitation can be either in the coder or the decoder part of the codec, or in both parts. This can also be expressed as a combination of one or more data blocks which have been scheduled by the controlling node for transmission from a transmitting party which is either the controlling node or a user in the cell, the transmitting party having a coder-decoder whose efficiency is below a defined limit and the smallest physical units which have been scheduled by the controlling node for the transmission of those one or more data blocks.

Figure 2:
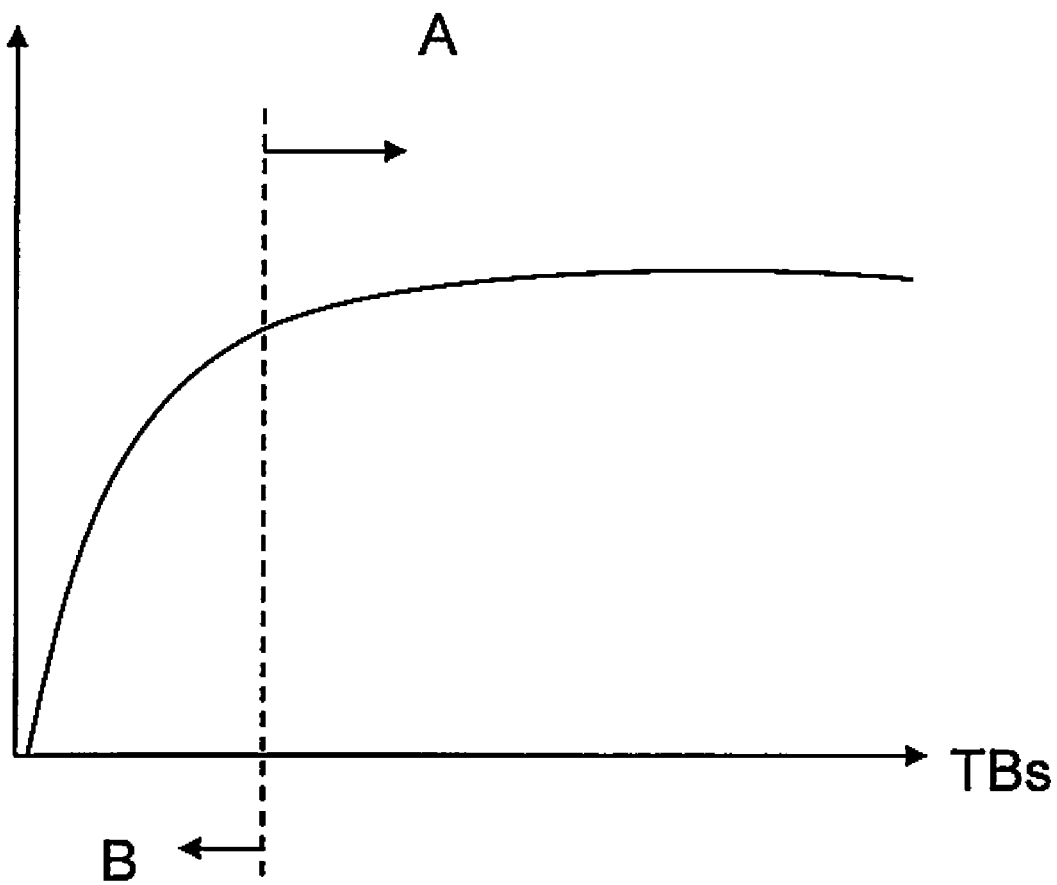
FIGS. 2 and 3 show problems addressed by the invention.

FIG. 2 illustrates an effect which is gained by means of the invention in uplink measurements of the performance indicator, RLB, Radio Link Bit rate, as a function of the Transport Blocks, TBs. As shown, certain TBs, to the left of the dashed vertical line, in the area shown as "B", will impact negatively on the measurements; these are the TBs which, together with their scheduled REs, are excluded from the RLB downlink measurements of the invention in uplink measurements. In other words, the TBs which are included in the measurements of the invention are those to the right of the vertical dashed line, in the area shown as "A".

Figure 3:
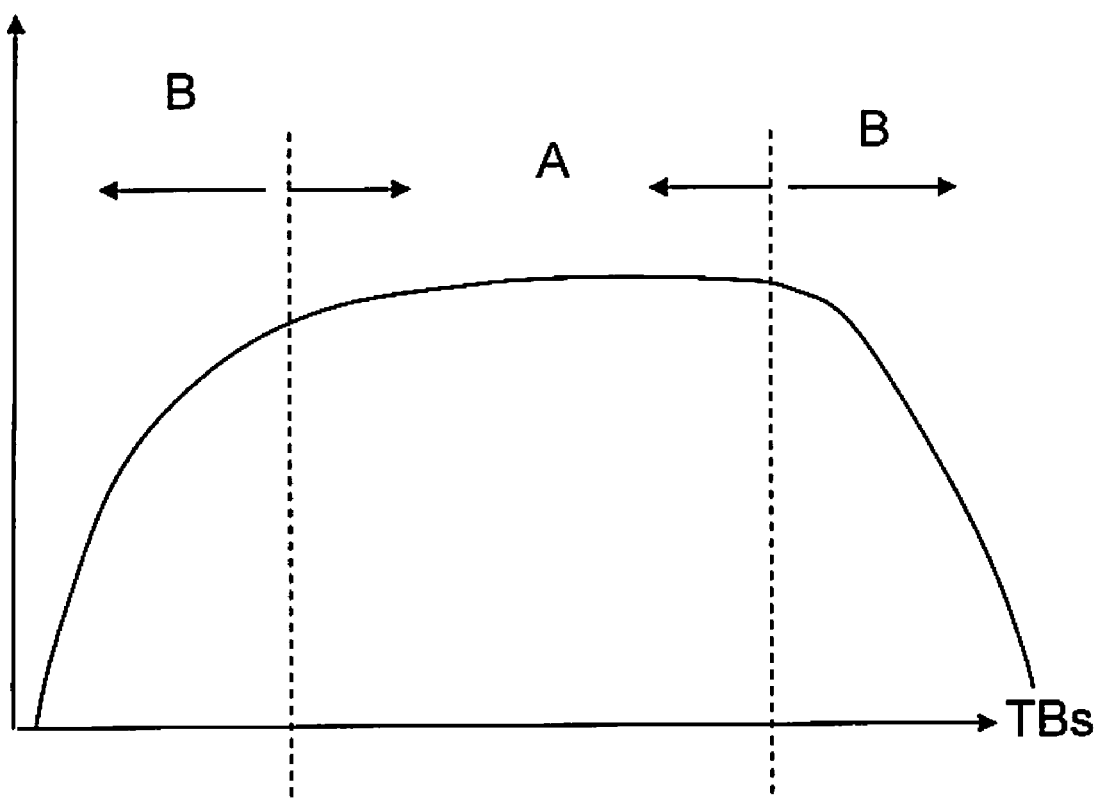

FIG. 3 shows an effect which is gained by means of the invention in downlink measurements of the performance indicator, RLB, Radio Link Bit rate, as a function of the Transport Blocks, TBs. As shown, certain TBs, to the right and to the left of the dashed vertical lines, in the areas shown as "B", will impact negatively on the uplink measurements; these are the TBs which, together with their scheduled REs, are excluded from the RLB uplink measurements of the invention. In other words, the TBs which are included in the measurements of the invention are those to the right of the vertical dashed line, in the area shown as "A".

Regarding the amount of time during which the measurements are aggregated, this is a parameter which can be varied within the scope of the invention, but the amount of time should at least be such that an accurate measurement of the performance indicator can be obtained. Preferable ranges for the amount of time are 5, 10, 15, or even 60 minutes, although in some cases the aggregation can be done over one or more milliseconds.

Figure 4:
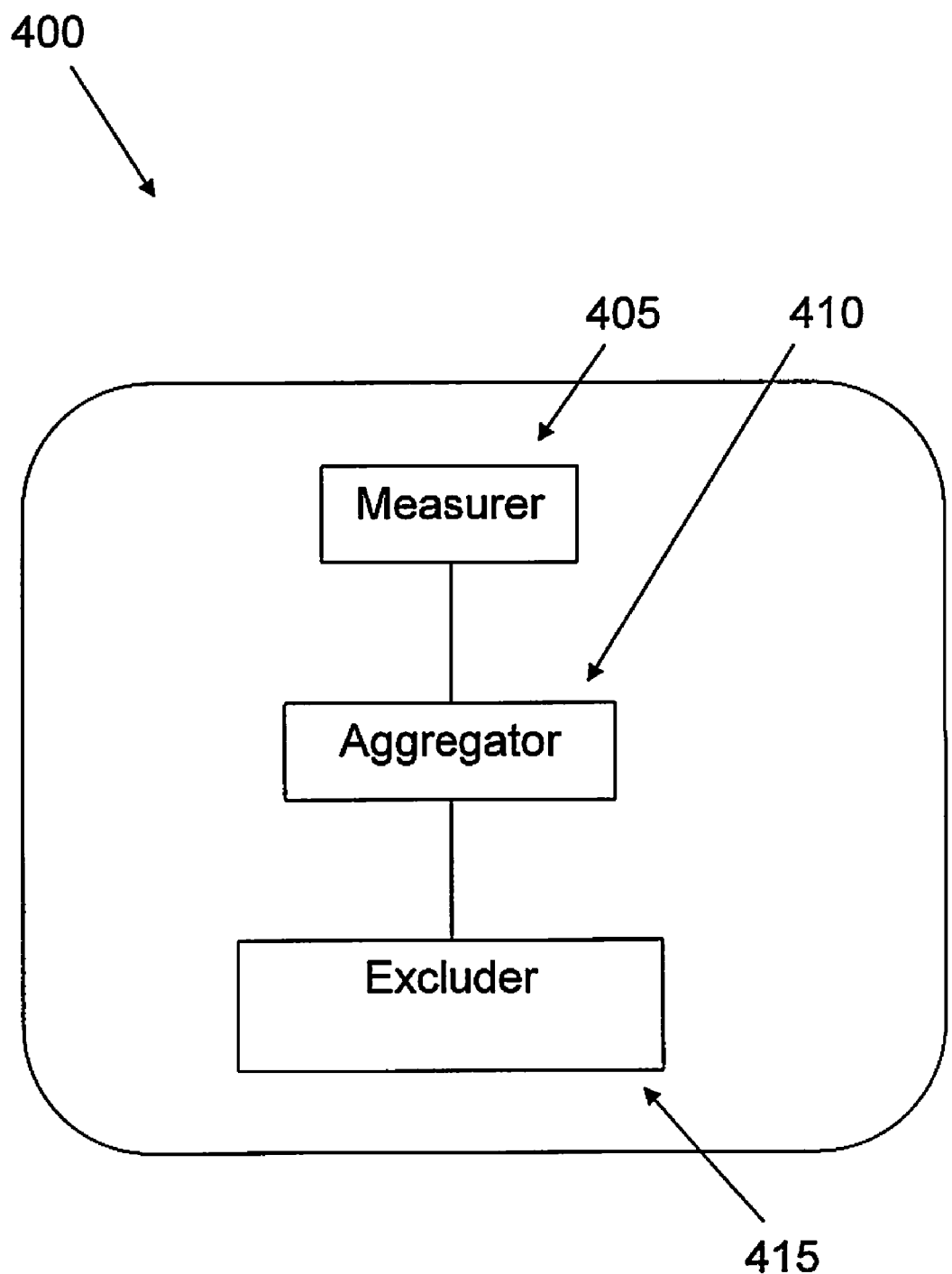
FIG. 4 shows a schematic block diagram of a controlling node of the invention.

FIG. 4 shows a schematic block diagram of an eNodeB 400 of the invention: as shown, one block in the eNodeB 400 is a measurer 405 arranged to measure a performance indicator of the communication between the node and at least one user in the cell, and one block in the eNodeB 400 is an aggregator 410 arranged to aggregate the measured performance indicator for the at least one user over a defined amount of time.

One block of the eNodeB 400 is an excluder 415 which is arranged to determine the performance indicator as the amount of data bits successfully transferred in blocks in at least one direction, uplink and/or downlink, between the controlling node and the at least one user during the defined amount of time divided by the number of smallest physical resources in the system, in terms of time and frequency, which have been used for the successful transfer of said bits during the defined amount of time, while excluding from the aggregated measurement one or more predefined combinations of one or more data blocks and one or more of the smallest physical resources in the system.

The measurer 405, the aggregator 410 and the excluder 415 may be implemented as software stored on a common media and run on a common CPU, or such software may be stored on separate media and CPU:s for all combinations of one or more of the respective blocks 405, 410, 415. As an alternative, the measurer 405, the aggregator 410 and the excluder 415 may be implemented in separate hardware units. Naturally, combinations of hardware and software implementations are also within the scope of the invention, so that one or more of the blocks are implemented as software in combination with one or more blocks which are implemented as hardware.

Figure 5:
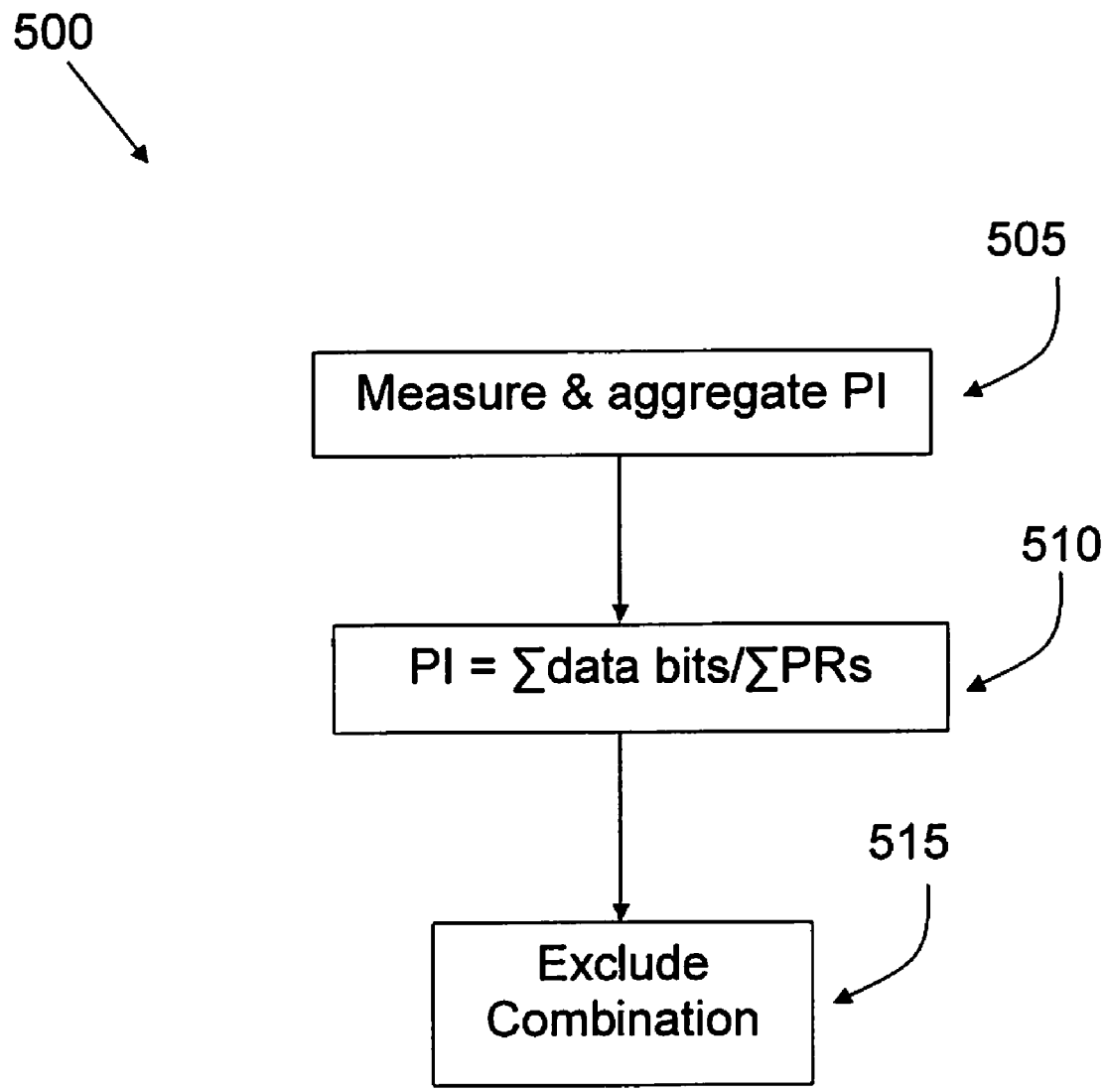
FIG. 5 is a schematic flow chart of a method of the invention.

FIG. 5 shows a schematic flow chart of a method 500 of the invention. As explained previously, the method 500 of the invention is intended for measuring a performance indicator of the communication between a controlling node of a cell in a cellular communications system and at least one user in the cell.

As shown in step 505 in FIG. 5, the method 500 comprises measuring and aggregating the measured performance indicator ("PI") for the at least one user over a defined amount of time. Step 510 indicates that the performance indicator is measured as the amount of data bits ("Σdata bits") successfully transferred in data blocks in at least one direction, uplink and/or downlink, between the controlling node and the at least one user during said defined amount of time divided by the number of smallest physical resources in the system in terms of time and frequency which have been used for said successful transfer of the data bits during said defined amount of time ("ΣPRs").

As shown in step 515, one or more predefined combinations of one or more data blocks and one or more said smallest physical resources in the system is excluded from the aggregated measurement.

The invention is not limited to the examples of embodiments described above and shown in the drawings, but may be freely varied within the scope of the appended claims.

The invention claimed is:

1. A controlling node for a cell in a cellular communications system, the controlling node comprising:
   a measurer, implemented by a central processing unit executing computer-readable instructions stored on a non-transitory computer-readable storage medium, for measuring, to measure a performance indicator of the communication between the node and at least one user in the cell, wherein
   the performance indicator is measured as the amount of data bits successfully transferred in data blocks in at least one direction, uplink and/or downlink, between the controlling node and at least one user during said defined amount of time, divided by the number of smallest physical resources in the system in terms of time and frequency which have been used for said successful transfer of the data bits during said defined amount of time;
   an aggregator, implemented by the central processing unit executing computer-readable instructions stored on the non-transitory computer-readable storage medium, to aggregate the measured performance indicator for said at least one user over a defined amount of time; and
   an excluder, implemented by the central processing unit executing computer-readable instructions stored on the non-transitory computer-readable storage medium, to exclude from said aggregated measurement one or more predefined combinations of one or more data blocks and one or more said smallest physical resources in the system.

2. The controlling node of claim 1, wherein the one or more predefined combinations comprise a combination of one or more data blocks which have been scheduled for transmission by the controlling node prior to the controlling node receiving information on the quality of the channel on which said one or more data blocks are to be transmitted and the said smallest physical units which have been scheduled by the controlling node for the transmission of those one or more data blocks.

3. The controlling node of claim 1, wherein one or more predefined combination comprise a combination of one or more data blocks which have been scheduled by the controlling node for transmission from a transmit buffer with said transmit buffer only filled to a defined limit and the said smallest physical units which have been scheduled by the controlling node for the transmission of those one or more data blocks.

4. The controlling node of claim 1, wherein the one or more predefined combinations comprise a combination of one or more data blocks which have been scheduled by the controlling node for uplink transmission from a user who cannot utilize more than a certain amount of its output power and the said smallest physical units which have been scheduled by the controlling node for the transmission of those one or more data blocks.

5. The controlling node of claim 1, wherein the one or more predefined combinations comprise a combination of one or more data blocks which have been scheduled by the controlling node for transmission from a transmitting party which is either the controlling node or a user in the cell, said transmitting party having a coder-decoder whose efficiency is below a defined limit and the said smallest physical units which have been scheduled by the controlling node for the transmission of those one or more data blocks.

6. The controlling node of claim 2, arranged to carry out said scheduling of transmission and corresponding smallest physical units.

7. The controlling node of claim 2, arranged to receive said scheduling of transmission and corresponding smallest physical units from another node in the system.

8. The controlling node of claim 1, wherein the controlling node is an eNodeB in a Long-Term Evolution (LTE) system.

9. The controlling node of claim 8, wherein said performance indicator is the Radio Link Bit Rate.

10. The controlling node of claim 1, wherein the controlling node is a base station (BS) in a WiMax system.

11. The controlling node of claim 10, wherein said performance indicator is the Physical Layer Data Rate.

12. A method for measuring a performance indicator of the communication between a controlling node of a cell in a cellular communications system and at least one user in the cell, the method comprising the steps of:

measuring and aggregating, by a central processing unit, the measured performance indicator for said at least one user over a defined amount of time, wherein the performance indicator is measured as the amount of data bits successfully transferred in data blocks in at least one direction, uplink and/or downlink, between the controlling node and the at least one user during said defined amount of time divided by the number of smallest physical resources in the system in terms of time and frequency which have been used for said successful transfer of the data bits during said defined amount of time, and identifying, by the central processing unit, one or more predefined combinations of one or more data blocks wherein one or more said smallest physical resources in the system meeting said identified predefined combinations are excluded from said aggregated measurement.

13. The method of claim 12, wherein the one or more predefined combinations comprise a combination of one or more data blocks which have been scheduled for transmission by the controlling node prior to the controlling node receiving information on the quality of the channel on which said one or more data blocks are to be transmitted, and the said smallest physical units which have been scheduled by the controlling node for the transmission of those one or more data blocks.

14. The method of claim 12, wherein the one or more predefined combination comprise a combination of one or more data blocks which have been scheduled by the controlling node for transmission from a transmit buffer with said transmit buffer only filled to a defined limit, and the said smallest physical units which have been scheduled by the controlling node for the transmission of those one or more data blocks.

15. The method of claim 12, wherein the one or more predefined combinations comprise a combination of one or more data blocks which have been scheduled by the controlling node for uplink transmission from a user who cannot utilize more than a certain amount of its output power, and the said smallest physical units which have been scheduled by the controlling node for the transmission of those one or more data blocks.

16. The method of claim 12, wherein the one or more predefined combinations comprise a combination of one or more data blocks which have been scheduled by the controlling node for transmission from a transmitting party which is either the controlling node or a user in the cell, said transmitting party having a coder-decoder whose efficiency is below a defined limit, and the said smallest physical units which have been scheduled by the controlling node for the transmission of those one or more data blocks.

17. The method of claim 16, wherein said scheduling of transmission and corresponding smallest physical units is carried out by the controlling node.

18. The method of claim 16, wherein said scheduling of transmission and corresponding smallest physical units from another node in the system is carried out by another node in the system and received by the controlling node.

19. The method of claim 18, applied in an eNodeB in a Long-Term Evolution (LTE) system.

20. The method of claim 12, according to which said data blocks are Long-Term Evolution (LTE) Transport Blocks.

21. The method of claim 12, applied in a base station (BS) in a WiMax system.

22. The method of claim 21, wherein said data blocks are WiMax PDUs, Protocol Data Units.

* * * * *